Nov. 26, 1957 W. SCHMID 2,814,237
ELECTRIC FEELER CONTROL ARRANGEMENT FOR MACHINES
Filed Sept. 23, 1952 9 Sheets-Sheet 1

Inventor
Wolfgang Schmid
By Michael S. Striker
Agt.

Nov. 26, 1957 W. SCHMID 2,814,237
ELECTRIC FEELER CONTROL ARRANGEMENT FOR MACHINES
Filed Sept. 23, 1952 9 Sheets-Sheet 2

*Fig.6*

Inventor
Wolfgang Schmid
By Michael S. Striker
agt.

Nov. 26, 1957 W. SCHMID 2,814,237
ELECTRIC FEELER CONTROL ARRANGEMENT FOR MACHINES
Filed Sept. 23, 1952 9 Sheets-Sheet 4

*Fig.8*

Inventor
Wolfgang Schmid
By Michael S. Striker
agt.

Nov. 26, 1957 W. SCHMID 2,814,237
ELECTRIC FEELER CONTROL ARRANGEMENT FOR MACHINES
Filed Sept. 23, 1952 9 Sheets-Sheet 5

Inventor
Wolfgang Schmid
By Michael S. Striker
agt.

Nov. 26, 1957 W. SCHMID 2,814,237
ELECTRIC FEELER CONTROL ARRANGEMENT FOR MACHINES
Filed Sept. 23, 1952 9 Sheets-Sheet 6

Inventor
Wolfgang Schmid
By Michael S. Striker
agt.

Nov. 26, 1957  W. SCHMID  2,814,237
ELECTRIC FEELER CONTROL ARRANGEMENT FOR MACHINES
Filed Sept. 23, 1952  9 Sheets-Sheet 7

Fig. 10ᵇ

| Controls | R1 | R2 | R3 | R4 | Round table | Strait movement |
|---|---|---|---|---|---|---|
| I | out | on | on | out | ( | to B → |
| II | out | on | on | on |  | to B → |
| III | out | on | out | on | ( | to B → |
| IV | on | on | out | on |  | ( |
| V | on | out | out | on | ( | to A ← |
| VI | on | out | on | on |  | to A ← |
| VII | on | out | on | out | ( | to A ← |
|  |  |  |  |  |  |  |

Fig. 19ᵃ

Inventor
Wolfgang Schmid
By Michael S. Striker

Nov. 26, 1957 W. SCHMID 2,814,237
ELECTRIC FEELER CONTROL ARRANGEMENT FOR MACHINES
Filed Sept. 23, 1952 9 Sheets-Sheet 9

Inventor
Wolfgang Schmid
By Michael S. Striker

United States Patent Office 2,814,237
Patented Nov. 26, 1957

2,814,237

ELECTRIC FEELER CONTROL ARRANGEMENT FOR MACHINES

Wolfgang Schmid, Gagny, France, assignor to Automata, Paris, France, a company

Application September 23, 1952, Serial No. 311,058

Claims priority, application Germany April 17, 1952

5 Claims. (Cl. 90—13.4)

The present invention relates to an electric feeler control arrangement for machines for machining parts by a process of reproduction from a template or pattern and is particularly applicable to the case in which closed contours are to be machined. It also provides a useful solution in the case in which it is desired to manufacture simultaneously two complementary parts, for example, a hollow die and its punch starting from a single template.

It can be applied to various kinds of machine tools in which the movements by which a template is explored by a feeler are translated into electrical orders transmitted through appropriate circuits to the control members of the longitudinally moving carriage and to those of the auxiliary support which can be a transverse carriage, a rotary table or any support which completes the principal rectilinear movement by an additional auxiliary movement. Those two kinds of movements will hereinafter be called the "longitudinal" movement and the "auxiliary" movement.

In particular, although it is to be understood that this statement has no limiting effect, the invention concerns machines, in particular milling machines, in which the feeler support is fixed and in which the template and the part or parts to be machined are each carried by a table arranged for rotary movement in both directions, the said tables being carried by a carriage arranged for rectilinear longitudinal movement.

According to the invention, the feeler is provided with a system of contacts by means of which at least five combinations of circuits comprising means for controlling the movements of the machine can be closed, the said contacts allowing seven kinds of "orders" of the feeler to be controlled and the movements corresponding to orders II, IV and VI being combined movements involving simultaneous use of both of the support controls.

Preferably, these combinations of circuits correspond to deflections of the feeler of increasing magnitude and are such that for orders I, III, V and VII, only one of the longitudinal or auxiliary movements is ordered while for orders II, IV and VI the longitudinal and auxiliary movements are simultaneously ordered, the direction of one of the movements being, in that case, reversed relatively to that of the preceding order.

The present invention thus provides a solution which can make the feeler control of such universal application that it can be used for all problems above mentioned. In this way, one obtains the advantage both of more rapid machining of the work and better adapation of the control system to the various shapes of parts to be machined. That improved adaptation also leads to an improvement in the quality of the surface as well as in the precision of the parts to be machined.

By way of example.

Figure 1:
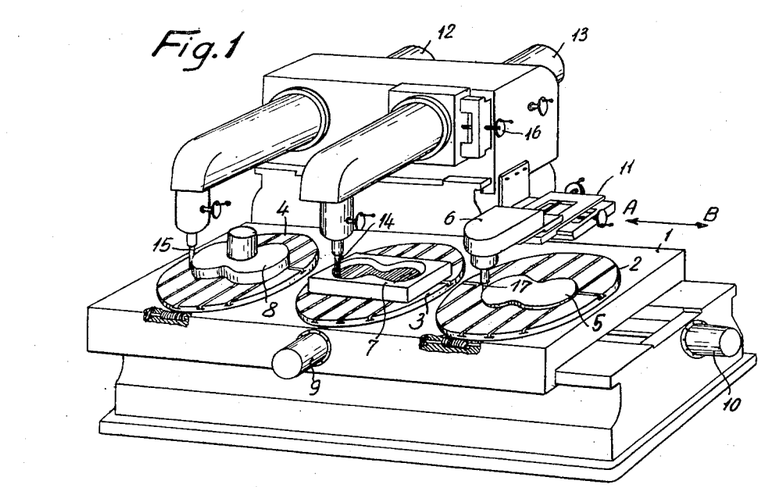
Figure 1 is a perspective view of a vertical milling machine having three rotary tables mounted on the longitudinal carriage, the feeler element and the magnetic clutches.

As is shown by Figure 1, the new feeler control can be used for the simultaneous machining of a punch and of a die from a single template. Accordingly, three rotary tables 2, 3 and 4 are mounted on the longitudinal carriage 1 of the milling machine. The template 5 is mounted on the rotary table 2 and is explored by means of the feeler element 6. The die 7, the internal contour of which is to be milled, is mounted on the rotary table 3. The punch 8 is mounted on the rotary table 4. All three rotary tables 2, 3 and 4 are actuated through the reversible magnetic clutch 9. The longitudinal carriage 1 is actuated in the direction A—B by the reversible magnetic clutch 10. In order that the feeler element may be adjusted relative to the tools, it is mounted on a cross slide 11. The two tool carrying spindles are actuated by motors 12 and 13. The cutter 14 is adjustable with respect to the cutter 15 in the direction A—B by means of the hand wheel 16. It is useful to arrange on the spindle of the hand wheel 16 a vernier in order that the necessary adjustment may be effected with precision and correspond to the diameter of the cutter. At the instant at which the machine is energized, the feeler element controls the two reversible magnetic clutches 9 and 10 and automatically explores the external contours of the template 5. The cutter 14 cuts the internal contour in the die 7 while the cutter 15 cuts the external contour of the punch 8.

Figure 2:
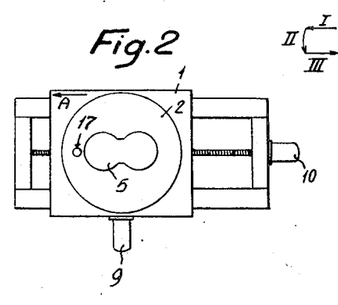
Figures 2, 3, 4 and 5 are plan views of a portion of Fig. 1 showing the finger of the feeler element and its positions relative to the template for four different positions of the longitudinal carriage and of the rotary table, the feeler element having three "ordering" positions and switching-in alternatively, movement of the longitudinal carriage or of the rotary table.
Figure 3:
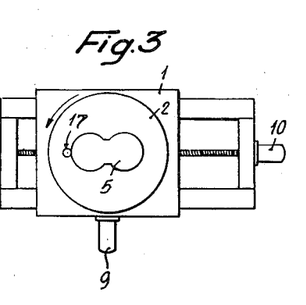
Figure 4:
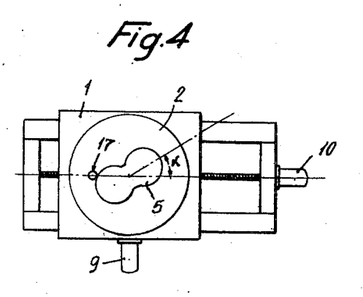
Figure 5:
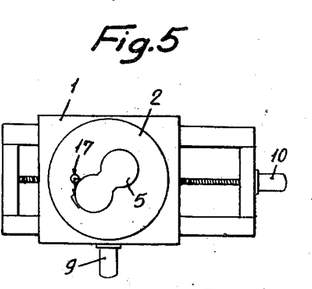

Figures 2, 3, 4 and 5, show the finger of the feeler element and its position relative to the contour of the template in four different positions of the longitudinal carriage and of the rotary table. The feeler has three order positions and determines alternatively, movement of the longitudinal carriage or movement of the round table. Figure 2 shows the finger 17 of the feeler element which is at a certain distance from the template 5. The feeler is then in the first order position, its spindle not being deflected. The rotary table 2 is not rotating and the magnetic clutch 9 is disengaged. On the other hand, the reversible magnetic clutch 10 is connected to the source of current and the carriage 1 will be displaced in the direction A. This will be explained more fully hereinbelow with respect to Figure 10. Figure 3 illustrates the instant at which the finger 17 of the feeler element touches the template. The spindle of the feeler element is deflected so that the feeler is in the second order position. The feeler element has thereby disengaged the reversible magnetic clutch 10 so that the longitudinal movement of the carriage 1 is interrupted and, at the same time, the magnetic clutch 9 of the rotary table 2 is engaged. The rotary table 2 then turns in the counterclockwise direction until the feeler element again becomes free. Figure 4 illustrates the position in which the template has turned through an angle α and the feeler element has returned to its first order position. The reversible magnetic clutch 10 is then again engaged by the feeler element and the rotary movement of the rotary table 2 is stopped. The template then again moves towards the feeler in the direction A by means of the longitudinal carriage 1. That exploration produces a step-by-step advance as shown in Figure 5.

Figure 6:
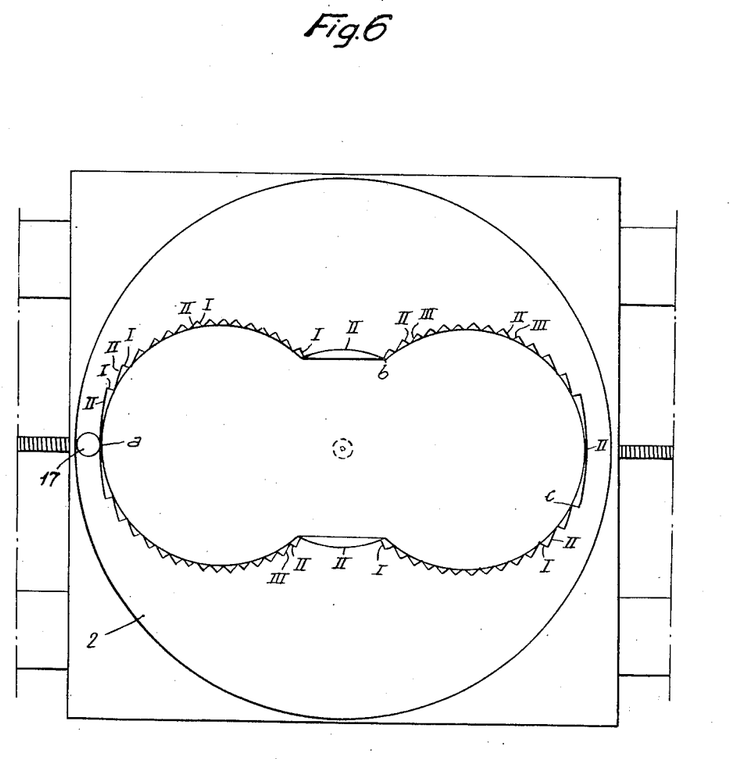
Figure 6 diagrammatically shows the steps in which the template is explored when using a feeler element having three order positions.

Figure 6 which relates to a device having three order positions (I), (II) and (III), shows, to a larger scale, the template and the steps which are formed by the exploration. From the point $a$ to the point $b$, the orders I and II are alternately utilized and from the point $b$ to the point $c$ the orders II and III are alternately utilized.

Figures 7, 7A:
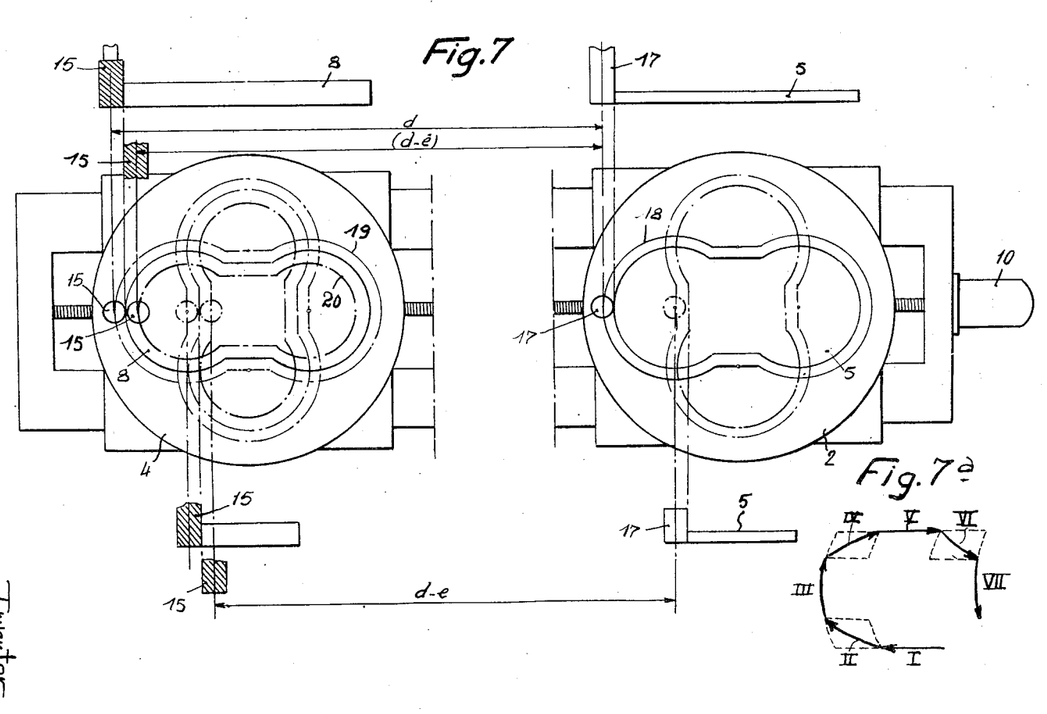
Figures 7 and 7a diagrammatically shows how it is possible to machine simultaneously the internal contour of a die and the external contour of its respective punch with a single template, by lateral adjustment of the position of the milling cutter relative to the feeler element.

Figures 7 and 7a show how the lateral adjustment of the cutter relative to the position of the feeler element is effected when an external contour is to be followed by the feeler element and the cutter is to cut an identical internal contour. The feeler element 17 follows the template mounted on the rotary table 2. The centre of suspension of the feeler element follows the trajectory 18 which is greater by half the diameter of the cutter than the contour of the template. If the cutter is disposed at a distance $d$ from the feeler element, its centre will follow a trajectory 19 of the same magnitude as the trajectory 18. The part 8 to be machined which is mounted on the rotary table 4 and the external contour of which can be machined in this manner will therefore be of the same magnitude as the template. If, however, it is desired to mill an internal contour corresponding to the part 5, the cutter must be laterally adjusted, the distance being chosen so as to correspond to the diameter of the cutter. That distance between the cutter spindle and the feeler spindle is shown in Figure 7 as the distance $d$—$e$. The centre of the cutter will then follow the line 20 which is smaller by half the diameter of the cutter than the contour of the template. In the case of a machine with two cutters adjusted relatively to each other shown in Figure 1, a punch and a die can thus be manufactured simultaneously with a single template.

Figure 8:
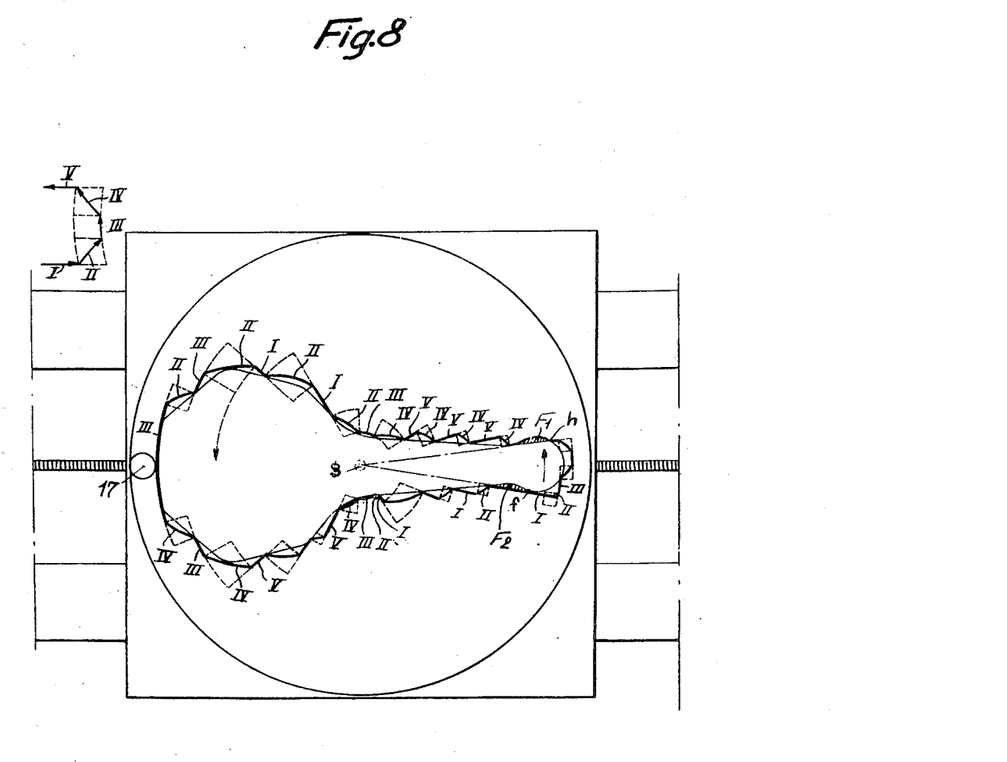
Figure 8 diagrammatically illustrates the manner in which a work-piece of difficult shape can be explored by means of a feeler having five order positions and showing the steps resulting from that exploration and the edges of the template at which difficulties ocur.

Figure 8 shows how to explore a part which is difficult to machine, using a feeler providing for five orders I, II, III, IV, V. In this figure are shown the steps resulting from the exploration and the regions or rather the edges of the template which can no longer be dominated by the feeler element. The five-order feeler element which is used in this case has, in addition to the three-order positions already described in connection with Figure 6, two further order positions as is shown in Figure 8, for which positions, rotary movement of the rotary table is simultaneously engaged with rectilinear movement of the longitudinal carriage. That exploration system adapts itself much better to the contour because during orders II, III and IV, the rotary movement of the rotary tables will not be interrupted. The method of exploration illustrated in Fig. 8 is most suitable for a large number of parts to be machined but is not adaptable to all shapes. As indicated in Fig. 8, at the point $f$, the feeler element can no longer move freely. The cross-hatched part F1 is situated above the line $g$—$h$ and the surface F2 also gives rise to difficulties because it is situated below the line $g$—$h$. The feeler element cannot enter into that hollow.

Figure 9:
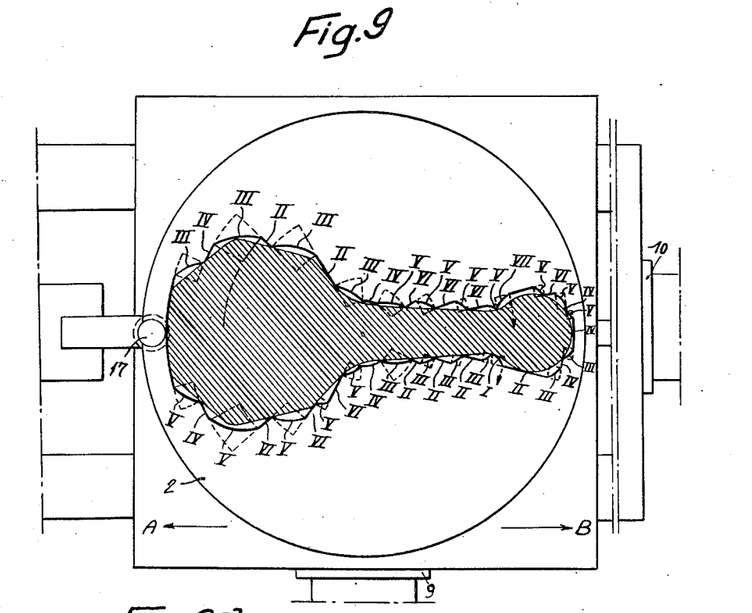
Figure 9 diagrammatically illustrates how such difficult shapes of workpiece as shown in Fig. 8 can also be machined by using a feeler having seven order positions.
Figure 9A:
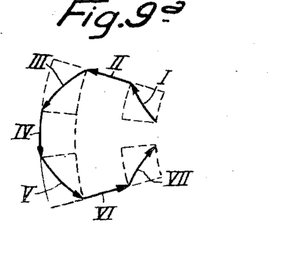
Fig. 9a diagrammatically illustrates the connection diagram of the seven order positions.

Figure 9 shows how by using a feeler element providing for seven orders I, II, III, IV, V, VI, VII, the feeler element can be made to follow parts having shapes of the type shown in Fig. 8 and even parts which are still more difficult. According to Fig. 9, the circular table 2 is engaged for clockwise rotation by a feeler element functioning in accordance with order I. For order II, only the longitudinal movement of the carriage 1 is initiated, while for order I, both rotary movement of the rotary table and rectilinear movement of the longitudinal carriage are initiated. Similarly, for order III, both movements are initiated but the rotary table turns in the opposite or counterclockwise direction. From the references shown in Figure 9, which correspond one by one to the exploration steps, the manner in which the orders of the feeler element are determined in accordance with each of the parts of the workpiece can be seen.

Figures 10, 10A:
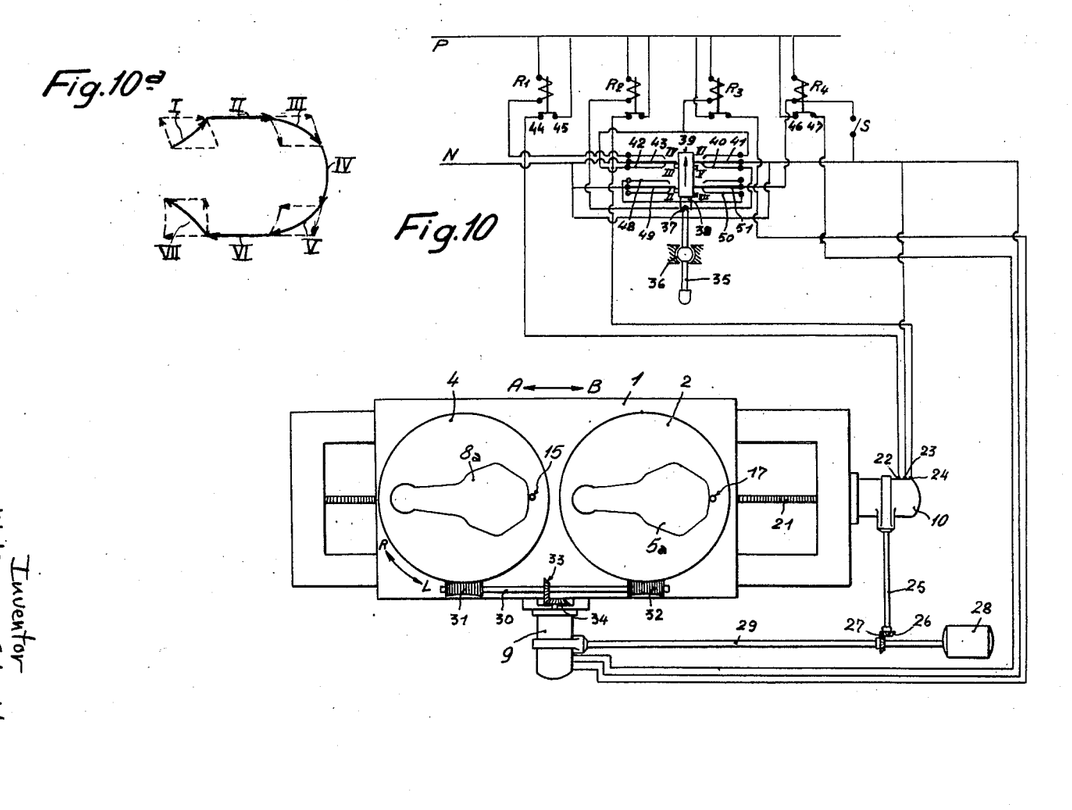
Figures 10, 10a 10b diagrammatically illustrate the working principle and the connection diagrams for a contour feeler element control device having a feeler element with seven order positions.
Figure 10B:
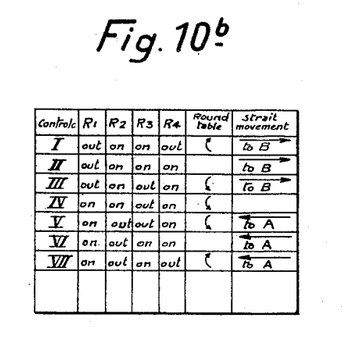

Referring now to Figures 10, 10a and 10b, the working principle and the connection for a feeler element control for milling the contours with a feeler element providing for seven kinds of orders will be explained. The cutter carriage 1 can be actuated in the longitudinal direction A—B by the feed screw 21. The screw 21 is actuated by the reversible electro-magnetic clutch 10. According to the voltage at the terminals 22 and 23 or 23 and 24, the magnetic clutch turns clockwise or counterclockwise. The feed screw 21 will be actuated with the shaft 25 and the two bevel wheels 26 and 27 will be actuated by the motor 28. The motor 28 also actuates the second reversible electro-magnetic clutch 9 through the shaft 29. By means of that clutch, the rotary tables 3 and 4 are rotated in the direction indicated by the arrows R or L. A number of rotary tables can thus be rotated simultaneously by means of the shaft 30. Each of the two rotary tables 3 and 4 is provided with a ring of peripheral gear teeth which engage worms 31 and 32. On the shaft 30 is mounted the bevel wheel 33 with which engages the bevel wheel 34 which is mounted on the driving shaft of the clutch 9. The template 5a, which corresponds with the shape of the part to be machined, is mounted on the rotary table 2. The finger 17 of the feeler element follows the contour of the template. The part 8a to be machined is mounted on the rotary table 4. The contour of the part 8a will be milled by the cutter 15. If the finger 17 of the feeler element is not yet in contact with the template, the feeler-carrying shaft 35 will be in the vertical position. The feeler carrying shaft is in a spherical bearing 36 and can thus be deflected in all directions. At the upper end of the feeler-carrying shaft 35 is mounted a conical ended arm 37 which engages in a conical depression 38 formed in a block 39. If the feeler-carrying shaft is deflected, the block 39 will be displaced upwards as indicated by the arrow. The block 39 is provided with a number of lugs through which are displaced the projecting end portions of contacts disposed on both sides of it. Those contacts are connected to the relays $R_1$, $R_2$, $R_3$ and $R_4$. The two electro-magnetic clutches 10 and 9 are controlled by those relays in accordance with the deflections of the feeler-carrying shaft 35. As is indicated by Figures 10a and 10b, the feeler element provides for seven orders I, II, III, IV, V, VI and VII. Figure 10b shows the different control positions of the relays corresponding to different orders of the feeler element and the corresponding movements which are effected in consequence.

If the shaft 35 of the feeler element is not in contact with the template and, therefore, is vertical, that position corrsponds to order I. As is indicated by the table in Figure 10b, the relays $R_1$ and $R_4$ are de-energised. The relays $R_2$ and $R_3$ are energised. The two rotary tables turn in the direction R while the longitudinal cutter carriage 1 moves towards B. As soon as the template 5a touches the feeler element 17, the latter passes into the position corresponding to the order II in which the relay $R_4$ is energised (see the table). As a result, the magnetic clutch 9 will be disengaged. The only movement will be that of the longitudinal cutter carriage 1 in the direction B. If the feeler-carrying shaft 35 is deflected still further until it produces order III, the relay $R_3$ is energised. In consequence, rotation of the rotary table in the direction L will be initiated. The seven different kinds of movement will be initiated by the relays $R_1$, $R_2$, $R_3$, $R_4$. The relays have rest contacts and the clutches are engaged only if the relays are deenergized. If, therefore, a relay winding is defective, the fault will immediately become apparent.

For order I, the relay $R_2$ will be energized through the closed pair of contacts 40 and 41. The relay $R_3$ is energised by the closed pair of contacts 42 and 43. Through the normally closed contacts 44 and 45 of the unenergized relay $R_1$, the clutch 10 will receive current from the terminals 22 and 23. Through the normally closed contacts 46 and 47 of the relay $R_4$, which is likewise not energised, the reversible magnetic clutch 9 will receive current. For order II of the feeler, the pair of contacts 48 and 49 will be closed by the projecting end portion of the movable contact II. The relay $R_4$ will then be energized through the likewise closed pair of contacts 50 and 51 so that the rotary movement of the tables will be stopped. For order III, the pair of contacts 42 and 43 open and the relay $R_3$ is deenergized; rotary movement of the tables in the opposite direction will then be initiated. In this manner, the sequence of connections indicated in the table in Figure 10b will be obtained by the contact blades which the feeler successively actuates. The cut-out switch S (Figure 10), allows the order I of the feeler to be made ineffective at the start of operations. Subsequently, the carriage 1 of the milling machine C starts to move in the direction B while the rotary movement of the table which is normally initiated at the same time as the order I, does not occur. The cut-out switch S need not be actuated at this instant, indeed, not until the finger of the feeler element 17 comes into contact with the template. Instead of the cut-out switch S, a special relay can be provided having an automatic holding contact actuated by a press button which is released again as soon as the feeler element passes into the next position.

Figure 11:
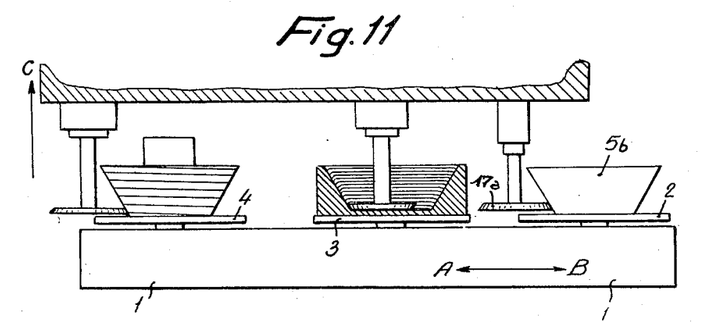
Figure 11 is an elevational view of an apparatus for the exploration of a three-dimensional pattern in which one of the milling cutters machines the desired die and the other milling cutter machines the corresponding punch.
Figure 12:
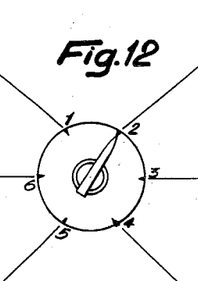
Figures 12–18 diagrammatically illustrate an electric feeler control for the reproduction of contours with a selector switch for selection of different modes of exploration.

Figure 11 shows how a three-dimensional pattern is explored when one of the cutters machines the desired die and the other the corresponding punch. The three rotary tables 2, 3, and 4 are mounted on the carriage 1 of the milling machine which will be actuated by the feeler element in the direction A—B. The pattern 5b is mounted on the rotary table 2 and will be felt by the finger 17a. While the rotary tables turn, the feeler 17a and the two cutters will be directed from upwards by the vertical support in the direction C and the pattern will be explored over a spiral trajectory. The vertical movement can be coupled directly with the movement of the rotary table or can be effected at constant speed. It is also possible to form the feeler in such a way that its finger can also be axially deflected upwards or downwards, the feeler having special contacts controlling the vertical movements. To that end a special reversible clutch will be provided for the vertical support.

Figures 13, 13A, 18, 18A:
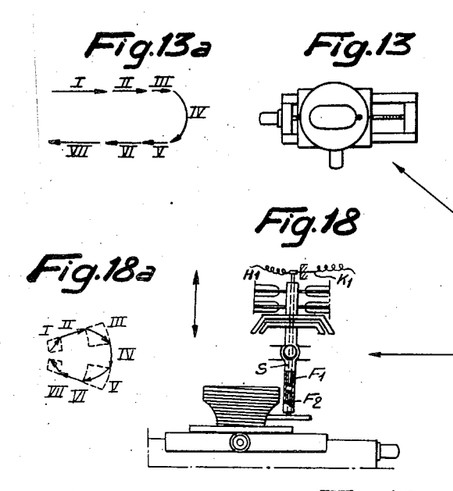

Figures 12–18 illustrate an electrical feeler control for such contour milling operations, the said control being provided with a selector switch for determining the appropriate method of exploration. The selector switch (Figure 12) has six positions 1–6 and the feeler element is controlled in each of those positions in accordance with the different principles shown in Figures 13–18. In position 1 of the selector (Figure 12) the first method of exploration (Figure 13) is actuated. The feeler element in that case provides for seven kinds of orders and connects the movements of the longitudinal carriage at different speeds to the control positions I–III. For order I, the cutter carriage advances very rapidly and that speed is decreased for the order II. For the order III, the longitudinal carriage advances at slow speed and stops completly for order IV. The rotary table rotates permanently and, in consequence, is not controlled by the feeler. For order V, the longitudinal movement of the cutter carriage changes direction; it starts moving, first of all slowly, and then, for order VI, it advances normally and for order VII, it advances rapidly. That method of exploration is preferable for parts to be machined which have simple shapes, as indicated in Figure 13. The machine works very rapidly when the round table turns permanently and, because of the adjustment of the speed, the movement of the longitudinal carriage adapts itself well to the shape of the part to be machined.

Figure 19:
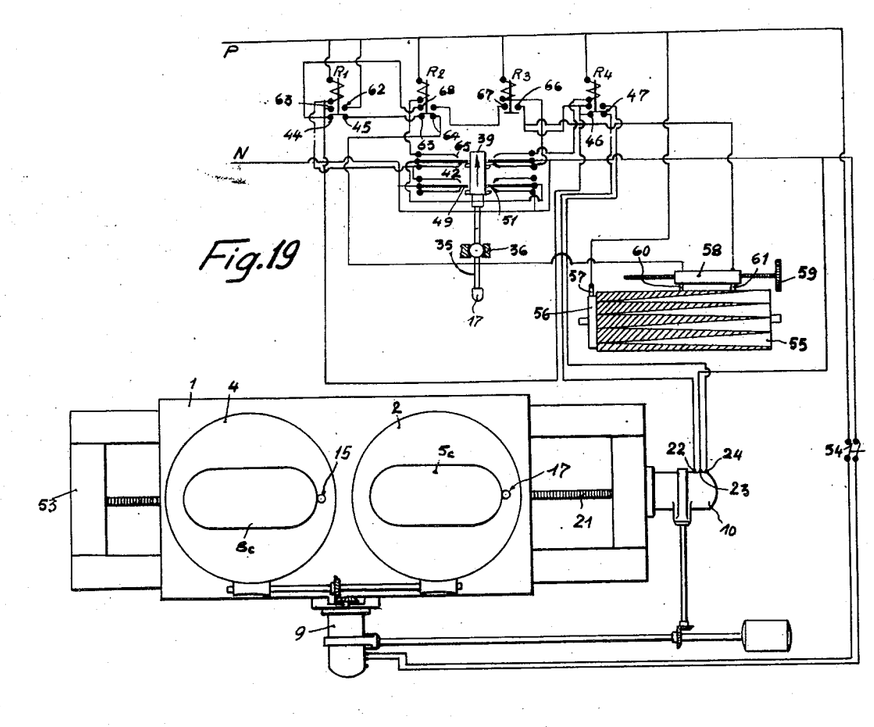
Figures 19 and 19a diagrammatically illustrate one mode of exploration determined by the selector switch of Figure 12.
Figure 19A:
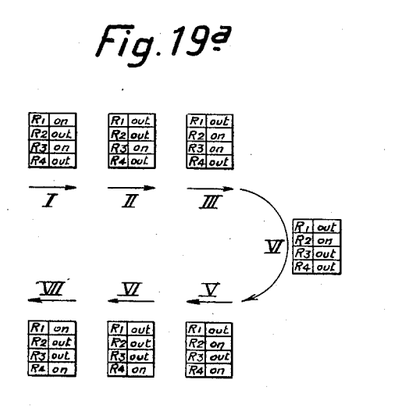

Figure 19 shows the diagram of connections for the method of exploration corresponding to Fig. 13. The milling carriage 1 carrying the two rotary tables 2 and 4 slides over the base 53. A template 5c, which will be explored by the feeler element 17, is mounted on the rotary table 2. The workpiece 8c, the contour of which will be machined by the cutter 15, is mounted on the rotary table 4. The magnetic clutch 10 actuates the shaft 21 for the longitudinal movement of the carriage 1 and the magnetic relay 9 actuates the rotary tables. The rotation of the rotary tables can be avoided by the cut-out switch 54. The feeler element 17 is mounted in a spherical bearing 36 and, as a result of its deflection, as has already been described in connection with Figure 10, the block 39 will be displaced upwards. As a result of that displacement, the contact tongues placed on the two sides of the block 39 will be brought into action. The spindle 35 of the feeler element is shown in its vertical position, that is to say, the feeler element 17 is in the position for order I. The four relays $R_1$–$R_4$ are controlled as has been described above in connection with Figure 10. Figure 19 gives a table of the connection positions for the relays for the seven kinds of order of the feeler. For adjustment of the longitudinal speed, a regulating cylinder 55 (Figure 19) has also been provided, which is driven at constant speed. The regulating cylinder has brass or copper segments inlaid in an insulating cylinder. The segments are connected electrically to the contact ring 56 which is wiped by the brush 57. The brush 57 is connected to the supply conductor P. The brushes 60 and 61 are fixed to the insulating block 58 which can be displaced laterally by means of the knurled knob 59. If the regulating cylinder 55 is short circuited, the clutch 10 turns at its full speed. If current is supplied to the clutch by the brush 60, the clutch turns at normal speed. If the current is supplied by the brush 61, the clutch 10 turns at slow speed. The relays $R_1$ and $R_3$ are energised for the position of the relay corresponding to order I (see table, Figure 19a). The relays $R_2$ and $R_4$ are de-energised. The winding of the relay $R_1$ will receive current through the contacts 42 of the feeler element as well as the contact 51. The magnetic clutch 10 will be energised in the following circuit: from conductor P to the terminal 62 over the closed working contact of the relay $R_1$—to the terminal 63—to the terminal 46—over the closed rest contact of the relay $R_4$—to the terminal 47—thence to the terminal 22 of the clutch 10— through the clutch winding to the terminal 23 and back to supply conductor N. For order II of the feeler, the contact 42 is opened so that the relay $R_1$ is deenergized. Current is then supplied to the reversible magnetic clutch 10 by the brush 60. The circuit is as follows: from conductor P—through the brush 57—the contact ring 56—through the regulating cylinder to the brush 60—terminal 64—the closed rest contact of the relay $R_2$—terminal 63—terminal 45—closed rest contact of the relay $R_1$—terminal 44—terminals 46 and 47 of the closed rest contact of the relay $R_4$—terminal 22 of the reversible magnetic clutch 10—central contact of the winding 23—conductor N. For order III, the feeler contact 65 will be closed so that the relay $R_2$ will be energised. The clutch 10 will receive current through the brush 61. The circuit will be: conductor P—brush 57—brush of the regulating cylinder 61—contact 66 over the closed working contact of the relay $R_3$—contact 67—closed working contact of the relay $R_2$—contact 68—and thence over the closed rest contact of the relay $R_4$, that is to say, terminals 46 and 47, to the terminal 22 of the clutch 10. For order IV of the feeler, the relay $R_3$ is deenergized. For order V, the relay $R_4$ is energised so that the current feed for the magnetic clutch 10 is directed towards the terminal 24 and the direction of movement of the clutch 10 is changed. The clutch still turns at slow speed because it receives from the brush 61 only very short impulses. For order VI of the feeler, the terminal 24 of the clutch will receive current from the brush 60 so that the impulses are stronger. For order VII, the regulating cylinder is again short-circuited and the clutch turns faster.

Figure 14:
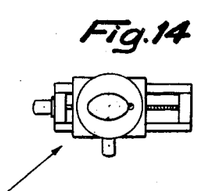
Figure 14A:
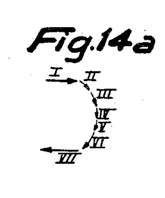
Figure 15:
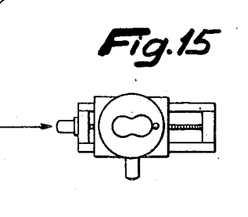
Figure 15A:
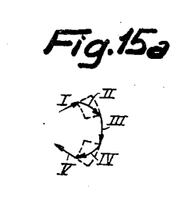
Figure 16:
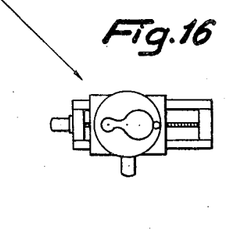
Figure 16A:
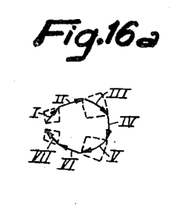
Figures 17, 17A:
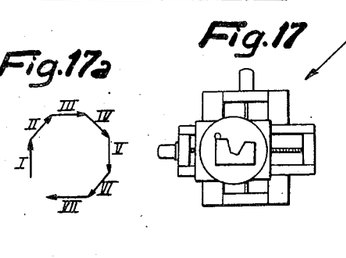

For the second method of exploration determined by the selector and shown in Figures 14 and 14a, the rotary table turns permanently but at a speed which can be regulated by the feeler element.

For order I of the feeler element, only the longitudinal movement of the milling carriage is initiated. For order II of the feeler element, the rotary table turns at high speed. For order III of the feeler element, it turns more slowly and for order VI of the feeler element the speed is still slower. If the feeler element is deflected still further, the speed of rotation will again increase as shown by the drawing. That manner of exploration has advantages if the contour of the template has very pronounced changes of curvature.

For the third manner of exploration determined by the selector switch in position 3 the feeler element works with five orders and for the fourth manner of exploration determined by the selector in position 4, the feeler element works with seven orders.

The fifth manner of exploration which is determined by the selector switch in position 5 is particularly advantageous when the work piece has rectilinear contours. The feeler element controls the cross slide in seven different directions. For this purpose, the rotary table can turn at slow speed.

For the sixth position of the selector switch, the vertical movement will also be controlled by the feeler element so that the latter can also explore shapes having edges which are irregular vertically, as shown in Figure 18. The feeler element carrying spindle is drilled and the spindle S carrying the contact $K_1$ at the foot slides in that perforation. The spindle S will be held in a central position by the springs $F_1$, $F_2$ so that a circuit is closed between the terminal 41 and the terminal 42. As a result of that contact, the magnetic clutch will be supplied with current for the vertical support. If the spindle S is drawn outwards or pushed upwards by the finger of the feeler element, the contact $K_1$ will open and at the same time interrupt the spindle movements.

The above descriptions clearly demonstrate that the feeler element arrangement forming the subject of the present invention allows various kinds of work to be produced. The drawings show only some of the possible arrangements. The selector switch of Fig. 12 can be provided with many different kinds of control in accordance with the use to which the machine is to be put. The circuits by means of which the feeler element is connected to the relays and the circuits for the contacts which are normally closed or normally open can be modified in accordance with the nature of the desired control. Cycles of movement having the most different characteristics can be effected with the same feeler element. The control which has been described above can be adapted to machines of the most diverse kinds, for example, the slotting machines and grinding machines.

I claim:

1. A machine for manufacturing articles by reproduction from a template by means of a feeler producing electrically orders which are transmitted to the driven members of the machine, comprising in combination: a base member; a longitudinal carriage movably mounted on said base member for rectilinear movement in two directions and provided with an electrically controlled clutch; at least one second support movably mounted on said base member for additional auxiliary movement and also provided with an electrically controlled clutch; a feeler element movably mounted on said base member for movement about a fixed point; a plurality of contact pairs mounted on said base member adjacent said feeler element, each of said contact pairs being movable respectively between circuit opening and circuit closing positions by respective movement of said feeler element; a plurality of relays having terminals connected in circuit with said contact pairs and the electrically controlled clutches of said longitudinal carriage and said second support, so as to provide at least five respectively different combinations of operation of the said driven members in response to at least five respectively different positions of said feeler element.

2. A machine according to claim 1 in which the second support includes a group of rotary tables and having cross slides for adjusting the position of the feeler support relatively to the group of rotary tables, at least along the centre line of the tables.

3. A machine for manufacturing articles by reproducing the form of a template, comprising in combination, a base member; a longitudinal carriage movably mounted on said base member for rectilinear movement in two directions and provided with a first reversible clutch; a second support movably mounted on said base member for additional auxiliary movement and provided with a second reversible clutch, said second support including means for supporting the template; a feeler element movably mounted on said base member in the region of said template and adapted to be contacted by the latter; and means cooperating with said feeler and directly controlled by the latter for actuating said reversible clutches in either direction, individually as well as in combination at any instant of time.

4. A machine for manufacturing articles for reproducing the form of a template, comprising in combination, a base member; a longitudinal carriage movably mounted on said base member for rectilinear movement in two directions and provided with a first electrically operated reversible clutch; a second support movably mounted on said base member for additional auxiliary movement and provided with a second electrically operated reversible clutch, said second support including means for supporting the template; a universally mounted laterally displaceable feeler element mounted on the machine in the region of said template and adapted to be contacted by the latter; and a plurality of contact pairs mounted on said base member in the region of said feeler element, each of said contact pairs being respectively movable between circuit opening and circuit closing positions by said feeler element when the latter is respectively displaced, said plurality of contact pairs being electrically connected in circuit with said electrically operable reversible clutches and energizing the same individually as well as in combination at an instant of time and in either direction, depending on the degree of displacement of said feeler element.

5. A machine for manufacturing articles by reproducing the form of a template, comprising in combination, a base member; a longitudinal carriage movably mounted on said base member for rectilinear movement in two directions and provided with means for moving said carriage, said means including a first electrically operated reversible clutch; a second support movably mounted on said base member for additional auxiliary movement and provided with means for moving said second support, said moving means including a second electrically operated reversible clutch, said second support including means for supporting the template; a universally mounted laterally displaceable feeler element mounted on the machine in the region of said template and adapted to be contacted by the latter; a plurality of contact pairs mounted on said base member, each of said contact pairs being respectively movable between circuit opening and circuit closing positions by said feeler element when the latter is displaced; and a plurality of relays having windings connected on the one hand to said plurality of contact pairs and on the other hand to said electrically operated reversible clutches, said plurality of relays energizing said electrically operated reversible clutches individually as well as in combination at any instant of time and in either direction in dependence on which of said plurality of contact pairs have been moved into circuit closing position by said feeler element whereby the contour of the template is continuously and automatically explored by said feeler.

References Cited in the file of this patent

UNITED STATES PATENTS

| | | |
|---|---|---|
| 1,588,856 | Shaw | June 15, 1926 |
| 2,331,337 | Meyer | Oct. 12, 1943 |
| 2,334,956 | Ridgway | Nov. 23, 1943 |
| 2,388,555 | Kuehni et al. | Nov. 6, 1945 |
| 2,445,971 | Rosen | July 27, 1948 |
| 2,493,828 | Parsons | Jan. 10, 1950 |
| 2,559,575 | Fryklund et al. | July 3, 1951 |
| 2,618,244 | Roehm | Nov. 18, 1952 |